(12) United States Patent
Iso et al.

(10) Patent No.: US 10,596,484 B2
(45) Date of Patent: Mar. 24, 2020

(54) PACKING

(71) Applicant: IHI Corporation, Koto-ku (JP)

(72) Inventors: Yoshiyuki Iso, Tokyo (JP); Jian Huang, Tokyo (JP); Mariko Saga, Tokyo (JP); Shinsuke Matsuno, Tokyo (JP); Hiroyuki Uchida, Tokyo (JP); Naoki Fujiwara, Tokyo (JP); Kenji Takano, Tokyo (JP); Kenji Tokuda, Tokyo (JP); Shiko Nakamura, Tokyo (JP)

(73) Assignee: IHI Corporation, Koto-ku (JP)

( * ) Notice: Subject to any disclaimer, the term of this patent is extended or adjusted under 35 U.S.C. 154(b) by 235 days.

(21) Appl. No.: 15/924,654

(22) Filed: Mar. 19, 2018

(65) Prior Publication Data
US 2018/0207544 A1  Jul. 26, 2018

Related U.S. Application Data

(63) Continuation of application No. PCT/JP2016/077781, filed on Sep. 21, 2016.

(30) Foreign Application Priority Data

Sep. 30, 2015 (JP) .................. 2015-193399

(51) Int. Cl.
*B01J 19/32* (2006.01)
*B01D 3/26* (2006.01)
(Continued)

(52) U.S. Cl.
CPC .............. *B01D 3/26* (2013.01); *B01D 53/18* (2013.01); *B01J 10/00* (2013.01); *B01J 19/32* (2013.01);
(Continued)

(58) Field of Classification Search
CPC .. B01D 3/26; B01D 53/18; B01J 10/00; B01J 19/32; B01J 2219/32206;
(Continued)

(56) References Cited

U.S. PATENT DOCUMENTS

| | | | | |
|---|---|---|---|---|
| 1,561,044 A | * | 11/1925 | Alexander | B01D 53/18 |
| | | | | 261/113 |
| 3,739,556 A | * | 6/1973 | Waters | F28C 1/02 |
| | | | | 96/356 |

(Continued)

FOREIGN PATENT DOCUMENTS

| | | |
|---|---|---|
| EP | 1 016 457 A2 | 7/2000 |
| JP | 53-111552 | 9/1978 |

(Continued)

OTHER PUBLICATIONS

Extended European Search Report dated Jun. 3, 2019 in European Patent Application No. 16851292.9, 7 pages.

(Continued)

*Primary Examiner* — Charles S Bushey
(74) *Attorney, Agent, or Firm* — Oblob, McClelland, Maier & Neustadt, L.L.P.

(57) ABSTRACT

A packing has a plurality of sheet materials spaced and arranged in parallel, and liquid flows along the flat surface thereof in a standing use state. Each sheet material has at least one member group including a plurality of support members arranged such that the upper end of the uppermost support member corresponds to the upper end of the sheet material and the lower end of the lowermost support member corresponds to the lower end of the sheet material. Each support member has a pair of support walls parallel to the liquid flow direction and perpendicular to the sheet material surface, and a bridging part connecting the support walls. A sandwiching structure is formed that one sheet material is held by at least one support member attached thereto and at (Continued)

least one support member attached to an adjacent sheet material, and it extends linearly through the plurality of sheet materials.

10 Claims, 7 Drawing Sheets

(51) Int. Cl.
*B01D 53/18* (2006.01)
*B01J 10/00* (2006.01)

(52) U.S. Cl.
CPC ............... *B01J 2219/32206* (2013.01); *B01J 2219/32213* (2013.01); *B01J 2219/32217* (2013.01); *B01J 2219/32227* (2013.01); *B01J 2219/32231* (2013.01); *B01J 2219/32237* (2013.01); *B01J 2219/32251* (2013.01); *B01J 2219/32258* (2013.01); *B01J 2219/32262* (2013.01)

(58) Field of Classification Search
CPC .... B01J 2219/32213; B01J 2219/32217; B01J 2219/32227; B01J 2219/32231; B01J 2219/32237; B01J 2219/32251; B01J 2219/32258; B01J 2219/32262
USPC ......................................... 261/112.1, DIG. 72
See application file for complete search history.

(56) References Cited

U.S. PATENT DOCUMENTS

| | | | | |
|---|---|---|---|---|
| 4,337,217 A | * | 6/1982 | Braun ...................... | B01D 3/24 261/112.1 |
| 4,701,287 A | * | 10/1987 | Manteufel ............. | B01J 12/007 261/81 |
| 5,536,454 A | | 7/1996 | Fujii et al. | |
| 5,624,733 A | * | 4/1997 | McKeigue ............... | B01J 19/32 261/112.2 |
| 6,325,360 B1 | * | 12/2001 | Rajan ..................... | B01D 53/18 261/112.1 |
| 6,560,990 B2 | * | 5/2003 | Hayashida ............... | B01D 3/20 261/103 |
| 10,265,676 B2 | * | 4/2019 | Iso ........................... | B01J 19/32 |
| 2004/0150122 A1 | * | 8/2004 | Engh ..................... | F28F 25/087 261/94 |
| 2006/0051274 A1 | * | 3/2006 | Wright ............... | B01D 53/1475 423/220 |
| 2013/0127075 A1 | | 5/2013 | Tsujiuchi et al. | |
| 2017/0014797 A1 | | 1/2017 | Iso et al. | |

FOREIGN PATENT DOCUMENTS

| | | |
|---|---|---|
| JP | 59-158499 | 10/1984 |
| JP | 02-001239 | 1/1990 |
| JP | 02-207837 | 8/1990 |
| JP | 06-210121 | 8/1994 |
| JP | 06-269627 | 9/1994 |
| JP | 06-269628 | 9/1994 |
| JP | 06-269629 | 9/1994 |
| JP | 07-121357 | 12/1995 |
| JP | 11-300199 | 11/1999 |
| JP | 2002-263478 | 9/2002 |
| JP | 2010-062111 | 3/2010 |
| JP | 2012-120999 | 6/2012 |
| JP | 2013-017982 | 1/2013 |
| WO | WO 2015/151912 A1 | 10/2015 |

OTHER PUBLICATIONS

International Search Report dated Nov. 15, 2016 in PCT/JP2016/077781 filed Sep. 21, 2016 (with English Translation).
Written Opinion dated Nov. 15, 2016 in PCT/JP2016/077781 filed Sep. 21, 2016.

\* cited by examiner

PACKING

CROSS REFERENCE TO RELATED APPLICATIONS

This application is a continuation application of International Application No. PCT/JP2016/077781, filed on Sep. 21, 2016, which claims priority of Japanese Patent Application No. 2015-193399, filed on Sep. 30, 2015, the entire contents of which are incorporated by reference herein.

BACKGROUND

Technical Field

The present disclosure relates to a packing for promoting mass transfer between gas and liquid in gas-liquid contact.

Description of the Related Art

Conventionally, a gas separation apparatus employing gas-liquid contact is used in chemical plants, thermal power plants and the like, to separate, remove or recover a specific gas from a gas to be treated, containing various kinds of gases, such as an exhaust gas. For example, in a carbon-dioxide recovering apparatus, a gas containing carbon dioxide gets into contact with an absorbent such as an aqueous monoethanolamine solution, so that carbon dioxide is absorbed and separated. The absorbent that has absorbed carbon dioxide comes into gas-liquid contact while being heated, thereby carbon dioxide is released into a gas phase, which is recovered. In addition, in a gas purification apparatus for removing a harmful gas component from an exhaust gas and in a gas separation apparatus for separating a specific gas component from a mixed gas, a specific gas component is absorbed into an absorbent through gas-liquid contact.

Generally, an apparatus that performs gas-liquid contact has a packing for increasing the contact area between an absorbent and a gas, brings the absorbent and a gas into gas-liquid contact on the surface of the packing, and causes a specific gas component in the gas to be absorbed into the absorbent. Various forms of packing have been proposed as specific embodiments of packing useful for increasing the gas-liquid contact area.

In a gas-liquid contact apparatus disclosed in Publication Document 1 (see the Documents List below), in order to increase gas-liquid contact area, the gas-liquid contact surface of the packing is formed of one of a rough surface portion having center line average roughness of 50 μm or more, a porous surface portion having a plurality of drilled holes, and a net-like object. In addition, in a gas-liquid contact apparatus disclosed in Publication Document 2 (see the List), the gas-liquid contact surface is composed of a material having a net-like body bonded to a surface of a sheet-like body. In a gas-liquid contact apparatus disclosed in Publication Document 3 (see the List), a gas-liquid contact portion is constituted of a gas-liquid contact unit in which a large number of three-dimensional knitted fabrics are arranged in a vertical or substantially vertical direction.

In contrast, Publication Document 4 (see the List) discloses a gas-liquid contact apparatus in which a tubular structure having a horizontal cross-sectional shape of a circle, a semicircular arc, a spiral or the like is used as a packing material.

Documents List

Publication Document 1: Japanese Patent Application Laid-Open (JP-A) No. H6-210121

Publication Document 2: Japanese Patent Application Laid-Open (JP-A) No. H6-269628 A Publication Document 3: Japanese Patent Publication (JP-B) No. H7-121357

Publication document 4: Japanese Patent Application Laid-Open (JP-A) No. H6-269629

BRIEF SUMMARY

However, it takes time and labor to process each of the packing materials disclosed in Publication Documents 1 to 3, and manufacturing cost of the packing is greatly increased. Particularly, since a net-like body such as wire gauze and a three-dimensional knitted fabric is structurally soft, it is difficult to make the net-like body stand alone, and the shape of the net-like body easily distorts when performing the treatment with the net-like body in a standing state. Therefore, a support member such as a sheet-like body having strength is required, and therefore the weight of the entire packing increases. Due to the increase in the weight of the packing, the support structure of the packing needs to be strengthened that leads to an increase in the weight and the size of the apparatus, increasing material costs and manufacturing costs.

In addition, in a structure in which a flow path of a gas flowing in a packing has a complicated shape, the packing hinders the gas flow and pressure loss increases, resulting in lowering of energy efficiency in gas supply. In order to improve energy efficiency in gas supply, the gas flow is preferably close to a straight line. In this respect, the packing material disclosed in Publication Document 4 has a vertical gas-liquid contact surface, and flow resistance of a gas is small. However, with the structure disclosed in the Publication Document 4, it is difficult to increase the gas-liquid contact area. Moreover, the absorbent flowing along the packing tends to converge and concentrate locally, and it hardly flows uniformly on the surface of the packing.

In order to keep low the energy consumed during operation, it is desirable to use a packing in which sheet materials (thin-layer materials), capable of suppressing flow resistance of the gas, are arranged in parallel. Manufacturing and processing costs of the packing with such a structure is also possible to decrease. However, means for preventing deformation and deflection due to lowering of material strength is required when decreasing the thickness of the sheet material in order to secure the gas-liquid contact area. Although it is possibly to prevent deformation and deflection of the sheet material by attaching a reinforcing member, it is necessary to resolve the problems of a decrease in the gas-liquid contact surface area and hindrance of wetting by a liquid, caused due to presence of the reinforcing material.

The contents of the present disclosure have come to create in view of the above-described problems. An object of the present disclosure is to provide a packing for gas-liquid contact, capable of suppressing deformation and distortion of the packing while suppressing pressure loss in gas-liquid contact, and therefore capable of realizing preferable gas-liquid contact and efficient component transfer upon the treatment and enabling weight reduction of the packing.

In order to solve the above issues, according to an aspect of the present disclosure, a packing for gas-liquid contact comprises a plurality of sheet materials, the plurality of sheet materials being spaced and arranged in parallel, to be used in a standing state to cause a liquid to flow along a flat surface of each of the plurality of sheet materials, wherein each one of the plurality of sheet materials comprises: at least one member group including a plurality of support members which are attached to the sheet material and are arranged in such a manner that an upper end of an uppermost support member corresponds to an upper end of the sheet material and that a lower end of a lowermost support member corresponds to a lower end of the sheet material in the standing state, wherein each of the plurality of support members includes: a pair of support walls each of which is connected to the sheet material at one side so as to be parallel to a liquid flow direction and perpendicular to the flat surface along which the liquid flows; and a bridging part that connects the other sides of the pair of support walls, and wherein the at least one member group in each of the plurality of sheet materials is positioned such that, in the standing state, a sandwiching structure is formed that one sheet material of the plurality of sheet materials is held by at least one of the plurality of support members attached to the one sheet material and at least one of the plurality of support members attached to an adjacent sheet material, and that the sandwiching structure extends in a linear shape through the plurality of sheet materials.

It is possible to set such that, in each of the plurality of support members, each of the pair of support walls has a length in the liquid flow direction that is less than or equal to a length of a liquid film which is formed by the liquid flowing along the sheet material and which is possibly maintained against breakage that may occur in relation to a wetting angle of a surface of the support walls.

It is possible to set such that, in each of the plurality of support members, the pair of support walls are laminar and have a rectangular shape with a length in the liquid flow direction of not less than 3 mm and not more than 30 mm.

In each of the plurality of support members, an interval between the pair of support walls may be preferable to be not less than 5 mm and not more than 20 mm.

In each of the plurality of support members, each of the pair of support walls has a height corresponding to an interval between the plurality of sheet materials in the standing state.

It is preferable that, in each of the plurality of support members, the bridging part is connected perpendicularly to the pair of support walls, and has a rectangular shape with a length identical to a length of each of the pair of support walls and a width identical to an interval between the pair of support walls.

It is preferable that, in the standing state, the plurality of support members of the at least one member group are arranged on a vertical line or on a straight line inclined from a vertical direction, and the plurality of support members are arranged such that a distance in the vertical direction between a lower end of one support member of the at least one member group and an upper end of a support member adjacent to the one support member on a lower side of the one support member is 2 to 10 times a length of the pair of support walls in the liquid flow direction.

It is preferable that, in the at least one member group, the plurality of support members are arranged on a straight line inclined from the vertical direction in the standing state, and one of the pair of support walls of one support member of the plurality of support members and one of the pair of support walls of a support member adjacent to the one support member on an upper side or a lower side of the one support member are on an identical vertical line.

It is preferable that, in the packing, each of the plurality of sheet materials further comprises a first additional support member and a second additional support member which have the same structure as the structure of the plurality of support members and which are distributed on both sides of the straight line in which the plurality of support members of the at least one member group are arranged such that, in the standing state, an upper end of one of the first additional support member and the second additional support member corresponds to the upper end of the sheet material and a lower end of the other corresponds to the lower end of the sheet material.

It is preferable that the number of the at least one member group of each of the plurality of sheet materials is plural, and in each of the plurality of sheet materials, a distance between two support members adjacent to each other in a horizontal direction in the standing state is 2 to 20 times an interval between the pair of support walls of each of the plurality of support members. The sheet materials and the support members may be made of an expanded metal.

It is appropriate that each of the plurality of sheet materials is rectangular, and four of the plurality of support members of the at least one member group, the first additional support member, and the second additional support member are arranged to be close to four corners of the sheet material, respectively, and the distance between the corner of the sheet material and each of the four members (the distance between the corner and the support wall closer to the corner) is preferably about 50 mm or less.

According to the present disclosure, it is possible to obtain a packing for gas-liquid contact, capable of suppressing deformation and distortion of the packing and enabling weight reduction of the packing while suppressing pressure loss in gas-liquid contact. Therefore, it is possible to provide a gas-liquid contact apparatus capable of realizing preferable gas-liquid contact and efficient component transfer and having good energy efficiency during operation.

BRIEF DESCRIPTION OF DRAWINGS

FIG. 6A to FIG. 6C are schematic views, respectively, of a top surface of cylindrical packing for illustrating arrangement of members in the cylindrical packing, wherein FIG. 6A illustrates a first embodiment, FIG. 6B illustrates a second embodiment, and FIG. 6C illustrates a third embodiment, respectively.

DETAILED DESCRIPTION OF EMBODIMENTS

Figure 1A:
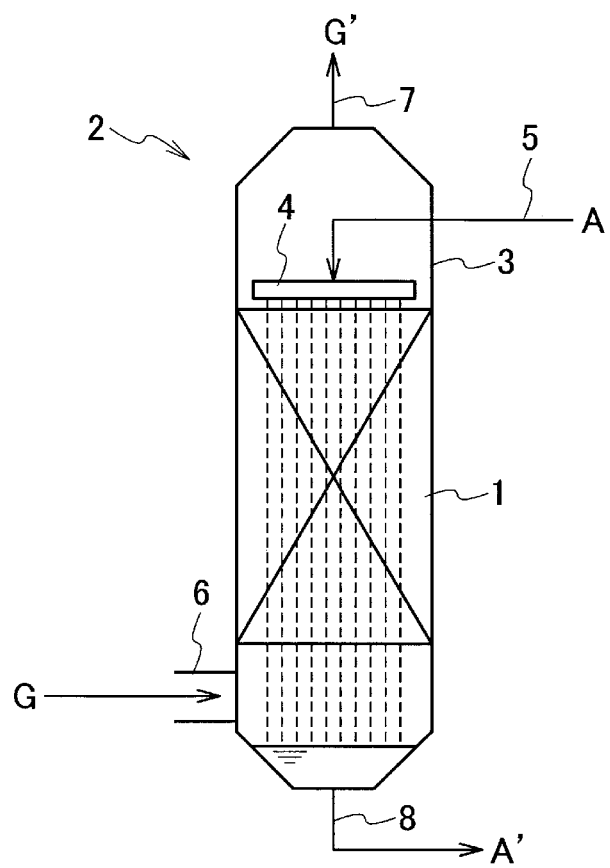
FIG. 1A is a schematic configuration diagram illustrating a gas-liquid contact apparatus in which a packing according to one embodiment of the present disclosure is used.

Description for embodiments of the present disclosure will follow by way of example only, with reference to the accompanying drawings. Dimensions, materials, concrete numerical values and the like indicated in the embodiments are only examples for facilitating understanding of the present disclosure and do not limit the present disclosure. Note that, in the description and the drawings of the present disclosure, elements having substantially an identical function and configuration are shown with denoted by identical reference numerals, and overlapped description will be omitted. Elements not directly related to the present disclosure are not illustrated.

Flow resistance of a gas when the gas comes to contact with a liquid affects the energy consumption during operation. In order to reduce operating costs, it is effective to use a packing configured of a plurality of sheet materials arranged in parallel. A packing 1 having such a structure is used in a gas-liquid contact apparatus 2 having a structure schematically illustrated in FIG. 1A in such a manner that the sheet materials are in a standing state. The flow path of a gas G in the packing 1 has a straight and simple shape formed between the sheet materials arranged in parallel at predetermined intervals. Therefore, the flow resistance is small, decrease in manufacturing and processing costs is possible, and a gas flow rate is controllable by appropriately adjusting the interval between the sheet materials. However, as the sheet material is prepared thinner in order to increase the gas-liquid contact area per volume, the strength of the sheet material lowers and deformation and deflection are more likely to occur. The packing is required to have durability against the weight and the load of falling energy of the liquid supplied thereto. In addition, in the case of a multistage apparatus or a large-sized apparatus, durability against the weight loaded thereon and strength against the load assumed to take place during assembling of the apparatus are also required. Therefore, even though the sheet material can satisfactorily maintain a self-standing state in the vertical direction, the sheet material is required to have structural reinforcing so that the sheet material can withstand the loads during operation and assembly.

Prevention of deformation and deflection of the sheet material is possible by attaching a reinforcing member. However, there is a concern that existence of the reinforcing member may cause not only loss of the wetted area in the portion to which the reinforcing material is attached but also reduction in the wetted area due to the influence on the liquid film around the reinforcing material caused by the reinforcing material. Specifically, such a phenomenon is more likely to occur that the liquid film formed by the liquid flowing uniformly over the surface of the sheet material breaks in the vicinity of the reinforcing material and that the flow of the liquid converges, thereby the liquid concentrates and flows locally. When the liquid flow converges, not only the gas-liquid contact area decreases, but also flow velocity of the liquid increases to make shorter the time during which the liquid stays on the surface of the packing. Therefore, the gas-liquid contact efficiency, or the absorption efficiency drops remarkably. Thus, in attaching the reinforcing member, it is preferable to construct the reinforcing member in such a form as to eliminate the influence on the wetting by the liquid as much as possible.

As a basic structure for reinforcing a thin-layered sheet material to stand, there is a structure that an elongated rib extending in the vertical direction is equipped to the erected sheet material. If a liquid is supplied from above the packing configured of a large number of sheet materials having such ribs and standing vertically in parallel to each other, as illustrated in FIG. 1B, the liquid A flows along the sheet material F and forms a liquid film on the surface of the sheet material F. At that time, due to wettability of the surfaces of the sheet material F and the rib R, tension acts in the direction along the surfaces of both members, and a portion Rt at which the thickness of the liquid film decreases is generated in the vicinity of the rib R. When this phenomenon becomes conspicuous, breaking of the liquid film occurs in the vicinity of the rib R and the flow of the liquid converges on the downstream side of the breaking point of the liquid film, so that the liquid flows downward while concentrating locally. Accordingly, the wetted area (gas-liquid contact area) decreases due to the liquid film breakage (see FIG. 2B).

Figure 2A:
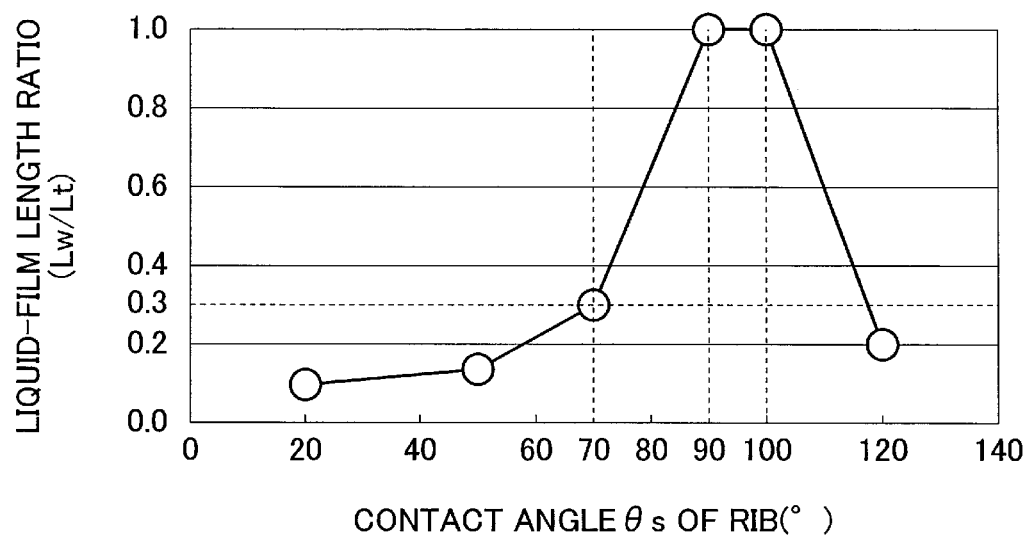
FIG. 2A is a graph illustrating a correlation between a contact angle of a surface of a rib reinforcing the sheet material and a liquid-film length ratio.
Figure 2B:
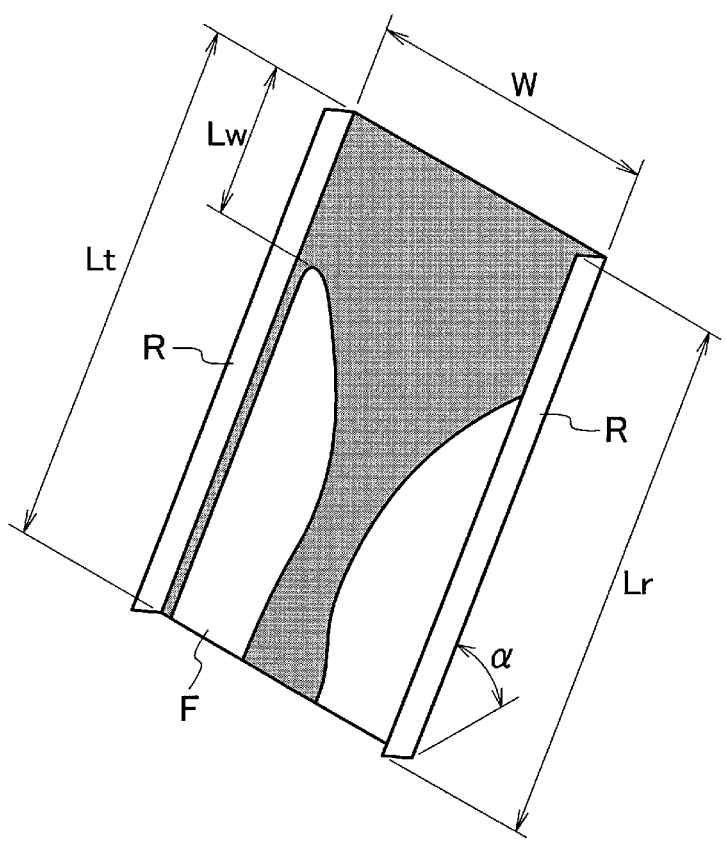
FIG. 2B is a schematic diagram illustrating a liquid flow analysis used for preparing the graph shown in FIG. 2A.

According to the examination of the above-described liquid film breakage in the vicinity of the rib by using a flow analysis based on computational fluid dynamics (CFD), there is obtained a result indicating that there is a correlation between the liquid film breakage and a contact angle $\theta s$ (that is, wettability) of the liquid on the surface of rib R, as shown in FIG. 2A. FIG. 2A is a graph obtained by analyzing the state of the liquid film formed on the sheet material F by the flowing liquid and by examining the influence of the contact angle $\theta s$ of the rib surface on the liquid film breakage. As the analysis conditions, the following case is assumed. As shown in FIG. 2B, a pair of sheet materials as the ribs R are provided perpendicular to the rectangular sheet material F made of stainless steel at both side ends thereof, the sheet material F is inclined and fixed so that an angle $\alpha$ from the horizontal plane is 60°, and a liquid is evenly supplied to the upper end of the sheet material F to make the liquid flow in that state. A liquid-film length ratio Lw/Lt indicated by the vertical axis of this graph represents the ratio of the length Lw of the liquid film from the upper end of the sheet material F to the point at which liquid film breakage occurs, with respect to the whole length Lr of the sheet material F. That is, this graph illustrates the relationship between the contact angle $\theta s$ [°] on the surface of the rib R and the point where liquid film breakage occurs. According to FIG. 2A, there is a clear correlation between the contact angle $\theta s$ of the surface of the rib R and the point where the liquid film breakage occurs. Specifically, when the contact angle $\theta s$ is in the range from 90° to 100°, the liquid film never breaks on the sheet material F having a length Lt, and the liquid-film length ratio Lw/Lt decreases as the contact angle $\theta s$ decreases. Therefore, a rib in which liquid film breakage is suppressed can be obtained if the above-described flow analysis is used upon designing of the rib to determine the value or the range of the contact angle $\theta s$ at which the liquid film length Lw becomes the maximal value (or the appropriate range) based on the analysis result, and if a rib material having surface properties (material, surface finishing) falling under the conditions of the contact angle is selected. However, since the contact angle of a material generally used actually as a constituent material and a peripheral material of a packing is generally small. In consideration of this point, if examination of possible values of the liquid-film length Lw is conducted, it can be understood that the liquid film length Lw is a value of 0.1 Lt or more regardless of the value of the contact angle $\theta s$ in FIG. 2A. That is, 0.1 Lt can be set as the minimal value of the liquid film length Lw. If the length Lr of the rib R is 0.1 Lt or less, the liquid film breakage is always prevented. Therefore, it is possible to prevent the liquid film breakage by determining the minimal value of the liquid film length Lw according to the correlation between the contact angle θs and the liquid film length Lw obtained from the flow analysis, and by setting the length of the rib to a value less than or equal to the minimal value of the liquid film length Lw. Further, prevention of the liquid film breakage is possible also in a case where the rib R configured of a specific material is attached to the sheet material F as a reinforcing member. In that case, the contact angle θs of the specific material constituting the rib may be determined to examine the liquid film length Lw at the obtained contact angle θs with reference to the correlation between the contact angle θs and the liquid-film length Lw. Then the length of the rib may be set to be less than or equal to the obtained liquid film length Lw.

The correlation between the contact angle θs and the liquid film length Lw varies depending on the surface properties of the sheet material F and physical properties (density, surface tension, viscosity, affinity, and the like) of the liquid to be supplied. However, even if the materials of the sheet material F and the liquid change to other materials, similar correlation is maintained, so that it is possible to obtain the length of the rib that can prevent liquid film breakage.

FIG. 2A shows the analysis result under the condition where a uniform smooth sheet having no irregularities on the surface is used as the sheet material F. Examples of the sheet material useful as a packing for gas-liquid contact include wire mesh formed of metal wires, and meshed sheet materials such as a punched metal sheet and an expanded metal sheet. Such a meshed sheet material requires reinforcement similarly to a flat sheet material. However, the meshed sheet material is a material having high gas-liquid contact efficiency and exhibiting good wettability. Particularly, the expanded metal sheet is a preferable material for a packing because a liquid flowing along inclined strands is likely to spread in the lateral direction and exhibits spreading of wetting in the lateral direction in an area greater than or equal to that of a smooth sheet. Evaluation of the liquid film length Lw based on the correlation as shown in FIG. 2A is also possible in a case where a fine-meshed sheet material is used. Particularly, in meshed sheet materials such as a wire mesh having inclined wires, a punched metal sheet and an expanded metal sheet, the liquid flows while swinging right and left along meshes. Then if the meshes of the sheet material are very fine, the liquid film formed as a coalescence of meandering flows approaches a layer, and a correlation similar to that shown in FIG. 2A appears. Therefore, even for a fine-meshed sheet material, the length Lr (≤Lw) of the rib can be set based on either of the liquid film length Lw to the liquid film breakage point or the minimal value of the liquid film length Lw determined from the contact angle θs of the rib, similarly to the case of the sheet material. Generally, it is possible to configure a preferable packing capable of preventing liquid film breakage by setting for the rib based on the correlation as described above, with use of a meshed sheet material having the mesh size (or center-to-center distance in the long mesh direction) of about 10 mm or less, and preferably about 5 mm or less.

The length Lr of the rib capable of preventing liquid film breakage varies depending on physical properties of the liquid, and surface properties of the sheet material and the rib. However, under general conditions for bringing the liquid into gas-liquid contact on the packing, the possible maximal value of the length Lr of the rib is generally about 30 mm. Such a short rib alone has a small function as a reinforcing member. Moreover, in a state of providing the rib perpendicularly not at a side edge but on the wetted surface of the sheet material, the liquid separates on both sides of the rib and merges again. Therefore, a thin rib is preferable in order to achieve sufficient binding of the liquid film by confluence. In general, a rib formed of a thin layer having the thickness of about 1 mm or less, preferably about 0.3 mm or less is suitable. Such a rib (referred to as a rib piece) formed of a thin layer does not have high strength in itself. However, a plurality of rib pieces used in combination can contribute to shape retention and reinforcement of the sheet material.

Figure 3:
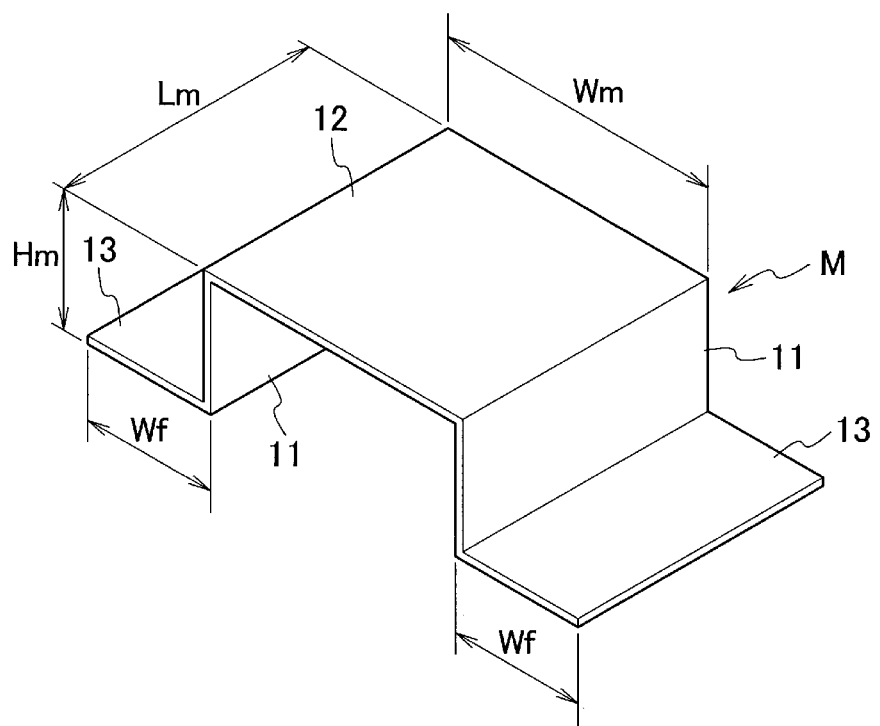
FIG. 3 is a perspective view illustrating a reinforcing member attached to the sheet material constituting the packing according to an embodiment of the present disclosure.

A rib piece formed of a thin layer as described above easily falls down when a load is applied to the rib piece from above in a state where the rib piece is provided perpendicularly on the sheet material. Therefore, in order to use the rib piece in the packing, joint strength between the rib piece and the sheet material is required so that the rib piece can keep the perpendicular state against the pressing force applied between the sheet materials in a state where the sheet materials are arranged in parallel. Therefore, the bonding method is limited. However, this problem is solved by incorporating a plurality of rib pieces into one member to constitute a structure. In the embodiments of the present disclosure, such a member is formed as a structure in which a bridging member connects upper ends of a pair of parallel rib pieces. Therefore, a common bonding method is usable when joining the member to the sheet material. Specifically, this member is a member M having a structure as illustrated in FIG. 3. The main part of the member M has an integral structure having a pair of support walls 11 and a bridging part 12 connecting upper ends of the support walls 11. The cross-sectional shape (cross section perpendicular to the liquid flow direction) of the main part is an angular U shape. The paired support walls 11 of the member M correspond to the above-described rib pieces. Therefore, the length of the support wall 11 in the liquid flow direction is less than or equal to the length of a liquid film that is formed by a liquid flowing along the sheet material F and can be maintained against breakage which may occur in association with the wetting angle of the surface of the support wall 11. That is, the length Lm of the support wall 11 is less than or equal to the possible maximal value of the above-described length Lr of the rib. Specifically, the length Lm is about 30 mm or less, and it is preferably about 20 mm or less. In addition, from the viewpoint of strength, the length Lm of the support wall 11 is preferably about 3 mm or more, preferably about 5 mm or more, and most preferably about 10 mm. The support wall 11 is thin laminar whose thickness is about 1 mm or less, and preferably about 0.3 mm or less. Each of the support walls 11 has a flange 13 provided at the lower end thereof. The member M and the sheet material F are joined together by placing the member M on the sheet material F and bonding the flange 13 to the sheet material F. The support wall 11 is connected perpendicular to the bridging part 12 and the flange 13, and the bridging part 12 is parallel to the flange 13. Therefore, the bridging part 12 has a rectangular shape with a width Wm substantially identical to the interval between the support walls 11 (ignoring the thickness of the support wall 11), and a length identical to the length Lm of the support wall 11. With such a structure, the bridging part 12 acts like a girder, thereby improving the durability against the pressing load as in the thin-walled rigid frame structure. Therefore, in a packing in which the sheet materials F are arranged in parallel, the member M favorably functions as a support member for supporting the adjacent sheet material, and also functions as a spacer for keeping the interval between the sheet materials. In a case where the member M is made of metal, the member M can be simply and easily joined to the sheet material F made of a metal such as a metal thin sheet, a wire mesh, an expanded metal, etc. by welding used as a bonding method for the sheet material F. In particular, when using spot welding, it is possible to join the flange 13 of the member M simply and efficiently to the sheet material. The member M may be bonded to the sheet material F with an adhesive, and in that case, the flange 13 can be reduced in size or omitted. The flange 13 acts also to reinforce the support wall 11, however, in consideration of the influence on liquid film formation, the width Wf is preferably about 20 mm or less, and preferably about 2 to 10 mm. The member M may have a configuration to connect three or more support walls with a bridging member. In this case, durability is increased. However, in terms of the influence on the wetted surface, weight reduction of the packing, easiness of processing and the like, a configuration with a pair of support walls is preferable.

Figure 4B:
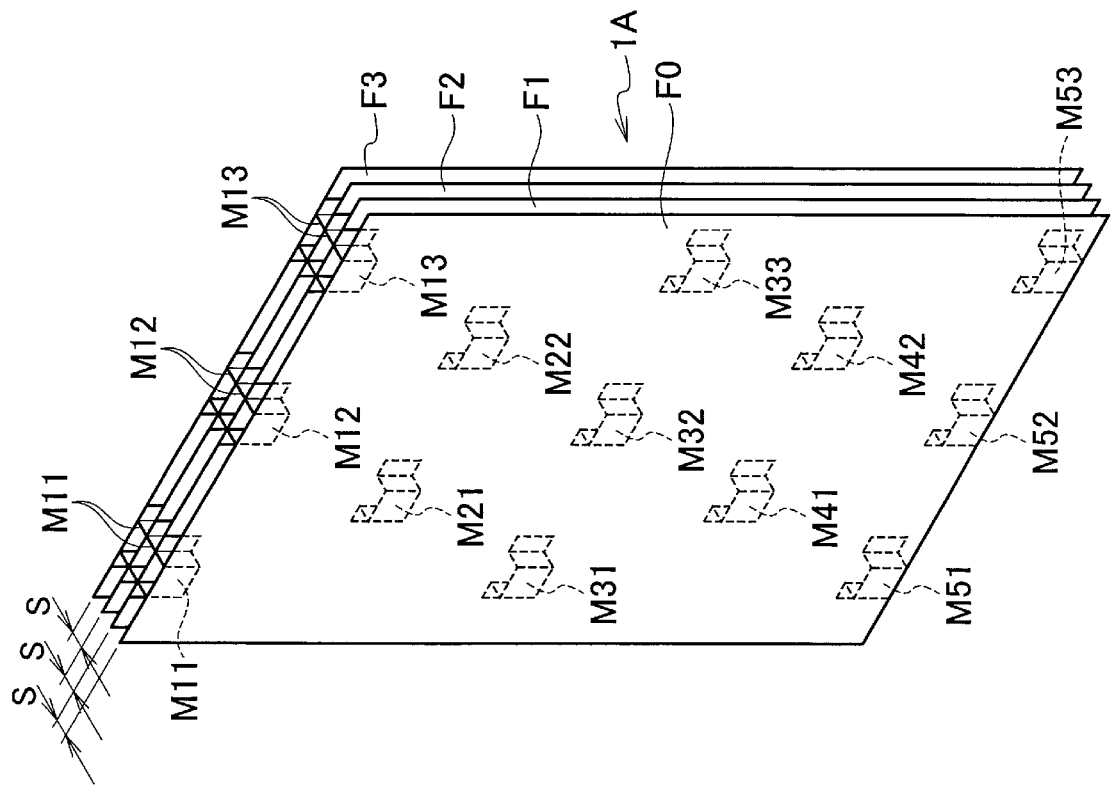
FIG. 4B illustrates an embodiment in which a packing is constituted by using the sheet materials illustrated in FIG. 4A.
Figure 4A:
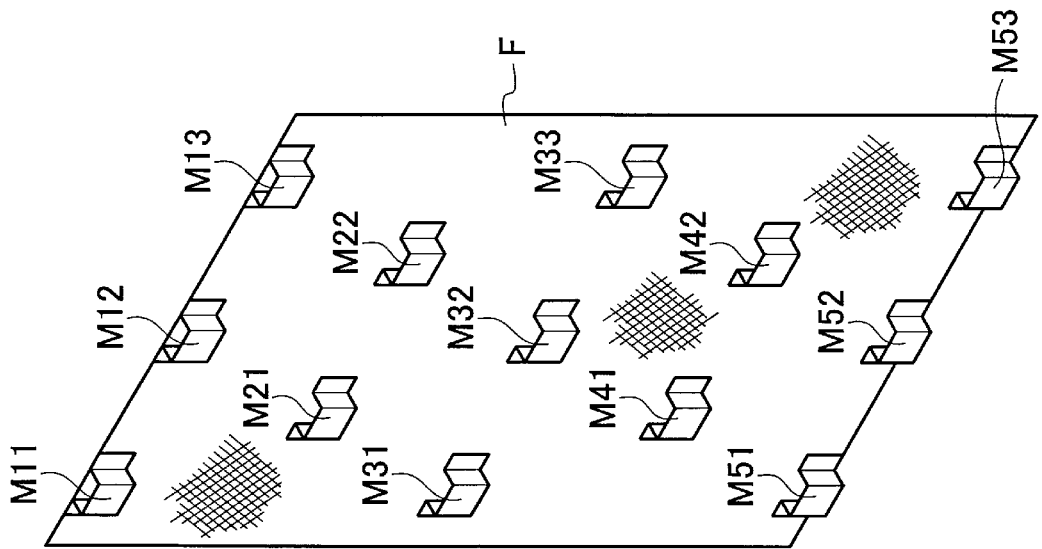
FIG. 4A is a perspective view illustrating an embodiment of a sheet material to which the members illustrated in FIG. 3 are attached.

As illustrated in FIG. 4A, for example, the pair of support walls 11 in a state where the member M is attached to the sheet material F are connected to the sheet material F at one sides and are connected to the bridging part 12 at the other sides (opposite sides). When the packing is used, the support wall 11 is parallel to the liquid flow direction and is perpendicular to the flat surface (the surface of the sheet material F, that is, the wetted surface) along which the liquid flows. In the flow analysis described above with reference to the structure of FIG. 2B, if the width W between the ribs R at both ends is made extremely small, the correlation as illustrated in FIG. 2A is no longer established and a liquid flowing between the ribs R converges to the center. That is, suppression of liquid film breakage becomes difficult. As a cause of this, it is conceivable that the surface tension balances near the ribs R at both ends influence each other. That is, in order to prevent liquid film breakage, it is preferable to separate the ribs R by a certain distance or larger. The distance in the horizontal direction between the ribs R is preferably about 10 mm or more. Therefore, in the structure of the member M as illustrated in FIG. 3, a preferable minimal value of the interval between the support walls 11 is determined in order to prevent liquid film breakage between the support walls 11. The member M is designed so that the interval between the support walls 11, or, the width Wm of the bridging part 12, is about 5 mm or more, and preferably 10 mm or more. In addition, in terms of the weight of the member M, the width Wm is preferably about 20 mm or less. When the packing is configured by arranging in parallel the plurality of sheet materials F to which the members M are attached (see FIG. 4B for example), the interval S between the sheet materials F is determined by the height of the member M, that is, a height Hm of the support wall. Therefore, the height Hm of the member M is set corresponding to the interval S (corresponding to the width of a gas flow path) of the sheet material F in the use state as the packing.

As in the case of the rib piece described above, the effectiveness of the member M in the form retention of the sheet material is also improved by using a plurality of members M in combination. In the embodiments of the present disclosure, each of the sheet materials F constituting the packing includes at least one member group having a plurality of members M. The plurality of members M constituting the member group preferably forms a row.

In a standing state where the plurality of sheet materials are arranged in parallel with an interval between the sheet materials, deformation due to a gravitational load or the like acting on the sheet material often occurs at the upper end portion and the lower end portion of the sheet material. Then the sheet material F easily buckles at the upper end and the lower end. Therefore, it is meaningful to determine such arrangement of the members M that can effectively prevent the above deformation. In the present disclosure, the plurality of members M in one member group are arranged in such a manner that the upper end of the uppermost member M (member M11, M12 or M13 in FIG. 4A for example) in the standing state corresponds to the upper end of the sheet material F, and that the lower end of the lowermost member M (member M51, M52 or M53 in FIG. 4A for example) in the standing state corresponds to the lower end of the sheet material F.

Furthermore, the member group in each of the plurality of sheet materials is positioned so that a sandwiching structure is formed among the sheet materials in the standing state. In the sandwiching structure, one sheet material is sandwiched and held between at least one of a plurality of members attached to that sheet material and at least one of a plurality of members attached to the adjacent sheet material (For example, see FIG. 4B). Those members are arranged to substantially overlap with each other via the sheet material. In this manner, the arrangements of the members are aligned between the parallel sheet materials F, thereby each member M reinforces the part of the sheet material F to which the member M is attached and supports one adjacent sheet material F. At the same time, each member M sandwiches and holds the sheet material F together with a member M provided on the other adjacent sheet material F on the opposite side, which acts to fix the position of the sheet material F. Therefore, it is possible to suppress hanging down of the upper end of the sheet material F and crushing of the lower end of the sheet material F by sandwiching and holding the sheet material F by the members M. If such a sandwiching structure extends linearly through the plurality of sheet materials (see, for example, FIG. 4B and FIG. 6), it is possible to obtain the same effect as fixing the positions of the plurality of sheet materials by a penetrating shaft. Therefore, it is possible to suppress the sheet materials from buckling and deflection. Such a chain of sandwiching structure is preferably a straight line perpendicular to the sheet materials. However, the chain may be a linear shape inclined with respect to the sheet materials, or a linear shape including gentle curve or serpentine. In FIG. 4B, a plurality of sheet materials F1 to F3 identical to the sheet material F to which the members M are attached in an arrangement as illustrated in FIG. 4A are stacked together with a sheet material F0 without the member M, and they are brought into a standing state. Thus a quadrangular prism-shaped packing 1A having the plurality of sheet materials arranged in parallel with an interval S between the sheet materials is formed. Positions of the corresponding members are matched among the sheet materials F1 to F3. Therefore, a linear sandwiching structure is formed, respectively, between the corresponding members. In FIG. 4B, the chained sandwiching structure is formed in thirteen straight lines. In the drawing, three sheet materials F1 to F3 are illustrated for the sake of convenience. However, by increasing the number of sheet materials F to be arranged in parallel, the thickness of the packing 1A substantially increases to an integral multiple of the height Hm of the member M.

Since the packing 1A of FIG. 4B is formed of sheet materials having an identical structure, the positions of the corresponding members among the sheet materials are substantially completely matched. However, even if the positions do not perfectly match each other, it is possible to fix the positions of the sheet materials if a part of members in each sheet material is involved in the sandwiching structure of the sheet materials. That is, the sandwiching structure is formed as long as at least a part of the support wall 11 or the bridging part 12 of the member M on one side of each sheet material and at least a part of the support wall 11 or the bridging part 12 of the member M on the other side of each sheet material are located at an identical position while they are involved in sandwiching and holding of the sheet material. Those members M are thus effective for suppressing deformation of the sheet material F. Therefore, a certain degree of variation is allowed in arrangement of the members M. In addition, chaining of the sandwiching structures extends preferably in a shape of a straight-line perpendicular to the sheet material. However, the chain may be a linear shape inclined with respect to the sheet materials, or a linear shape including gentle curve or serpentine. In a case where the shape of the packing 1 is a quadrangular prism, the packing can be constituted by using the sheet materials F having an identical structure. Therefore, as illustrated in FIG. 4B, arrangement in which substantially all the members M are involved in sandwiching and holding of the sheet material F is possible. The greater the number of members M involved in sandwiching and holding of the sheet material F is, the greater the effect of suppressing deformation of the sheet materials F is. However, it is not necessary for all of the members M attached to the sheet materials F to be involved in sandwiching and holding of the sheet material F.

With respect to the above-described rib piece, by arranging a plurality of rib pieces along a straight line with an interval between the rib pieces, the rib row can exhibit the reinforcing function synergistically as a whole. In other words, even with a discontinuous rib row having a gap, it is possible to obtain a reinforcing effect close to the effect obtained by a continuous long rib. However, in a configuration in which arrangement of the rib pieces is in the vertical direction (that is, in the liquid flow direction), if the interval in the vertical direction between the rib pieces is short, the liquid divided on both sides of a rib piece and then joins again at the lower end of the rib piece reaches the next rib piece before the liquid film formed by the joined liquid is stabilized. Therefore, the liquid flow state becomes close the state in the case of the continuous rib, and liquid film breakage is thus likely to occur. In consideration of the above, it is preferable to arrange the rib pieces so that the interval in the vertical direction between the rib pieces is about 10 mm or more, and preferably about 40 mm or more. Thereby the liquid film on the downstream side of the rib pieces is more likely to be stabilized.

The effect of forming the above-described rib row configured of a plurality of rib pieces is also obtainable in the member M that has a structure in which the rib pieces are integrated. The members M arranged in one row are equivalent to two rib rows. It is preferable that the plurality of members M constituting the member group is attached to the sheet material F so as to be arranged in a vertical line or a straight line inclined from the vertical direction (excluding the horizontal line) on the sheet material F in a standing state. In FIG. 4A, for example, the members M are arranged in zigzag to have a staggered shape of even distribution. This arrangement can be understood as an inclined arrangement in which two member groups which re configured of three members M12, M21, M31 and three members M33, M42, M52, respectively, and one member group configured of five members M13, M22, M32, M41, M51 are arranged in straight lines inclined from the vertical direction. Alternatively, this arrangement can also be understood as a vertical arrangement in which three member groups which re configured of three members M11, M31, M51, three members M12, M32, M52 and three members M13, M33, M53, respectively, and two member groups which are configured of two members M21, M41 and two members M22, M42, respectively, are arranged in straight lines in the vertical direction. In the case of inclined arrangement, the member M11 (or the member M13) at the upper end on one side and the member M53 (or the member M51) at the lower end on the other side are understood as additional support members.

Also in the arrangement of the members M, it arises similarly to the arrangement of the rib pieces that, if the support walls 11 are arranged at short intervals in the vertical direction, the liquid film between the support walls 11 is unstable and easily breaks. In consideration of this, it is appropriate to arrange the members M so that the interval between the support walls 11 in the vertical direction is about 9 mm or more, and preferably about 15 mm or more. From the viewpoint of strength, the members M are preferably arranged so that the distance between the lower end of the upper member M and the upper end of the lower member M in the vertical direction (liquid flow direction) is set to be about 10 times or less the length Lm of the support wall 11. Therefore, the distance in the vertical direction is about 2 to 10 times, and preferably about 3 to 10 times the length Lm of the support wall 11. Generally, it is appropriate to set the distance to about 9 to 100 mm, preferably about 15 to 80 mm, and more preferably about 40 mm. In addition, as well as appropriately setting the interval between the support walls 11 of the member M in order to prevent the liquid film breakage between the support walls 11, suitable setting is performed also in the arrangement of the members M on each sheet material F so that the distance in the horizontal direction between the two members M adjacent to each other in a standing state (that is, the distance between the support walls 11 of the adjacent members M, or the distance between the bridging parts 12) is set to about 20 mm or more, and preferably 30 mm or more. From the viewpoint of reinforcing action, the distance between the two members M is preferably about 20 times or less the interval between the support walls 11 (the width Wm of the bridging part 12). Therefore, the distance in the horizontal direction between the members M may be set to about 2 to 20 times the interval between the support walls 11. Thus, it is general to arrange the members M so that the distance is about 20 to 200 mm, preferably about 30 to 100 mm, and more preferably about 40 mm.

In the arrangement formed of the member groups, it is not necessary to arrange the members M at equal intervals. In addition, the distribution of the members M over the entire surface of the sheet material F needs not be uniform. An equal-interval arrangement and uniform distribution are advantageous from the viewpoint of manufacturing and assembly. Therefore, based on the equal-interval arrangement and uniform distribution, the arrangement and/or distribution of the members M can be appropriately weighted according to the characteristics or the like of the material used as the sheet material F. Generally, it is preferable that the number (distribution density) of the members M attached per unit area of the sheet material F is about 0.01 to 0.1 pieces/cm$^2$. Weighting of arrangement and/or distribution may be carried out, for example, in consideration of ease of buckling at the upper end portion and lower end portion, load concentration, and the like.

The members M may be arranged as follows, for example. Two member groups each configured of five members M are arranged on two parallel straight lines inclined from the vertical direction in the standing state of the sheet material F. In the arrangement on each inclined straight line, the inclination of the arrangement line and the interval between the members are adjusted in such a manner that one support wall of one member and one support wall of a member positioned above or below thereof are on an identical vertical line, and that the other support walls of these members are not on an identical vertical line. That is, in one member M and the lower member M, the support walls on the near side of them are on the same vertical line, and the other support wall of the lower member M is on the same vertical line as the support wall on the near side of the further lower member M. It is necessary for the support walls arranged in the vertical line in that manner to provide an interval capable of preventing liquid film breakage between them. However, if two support walls are arranged on a vertical line at an interval which satisfies this point and is about 10 times or less the length Lm of the support wall 11, reinforcing action in the vertical direction is enhanced. Therefore, the above arrangement is advantageous in reducing the number of members M attached to the sheet material F per unit area.

In the above-described arrangement, there are regions having low distribution density of the members on both outer sides of two rows formed of member groups arranged in the inclination direction. In order to solve this problem, in addition to the above-described two member groups, two members M may be attached as a first additional support member and a second additional support member having the same structure as that of the members of the member groups. The two members are allocated on both sides of two straight lines on which the members M constituting the member groups are arranged. One member M is arranged such that the upper end corresponds to the upper end of the sheet material and the other member M at the lower end thereof corresponds to the lower end of the sheet material F. In such an arrangement, if four of the members constituting the member groups, the first additional support member and the second additional support member are located near the four corners of the rectangular sheet material F, deflection of the sheet material F is likely to be suppressed. This advantage is remarkable when the distance between the corner of the sheet material F and the member M (the distance between the corner and the support wall closer the corner) is about 80 mm or less.

Figure 5:
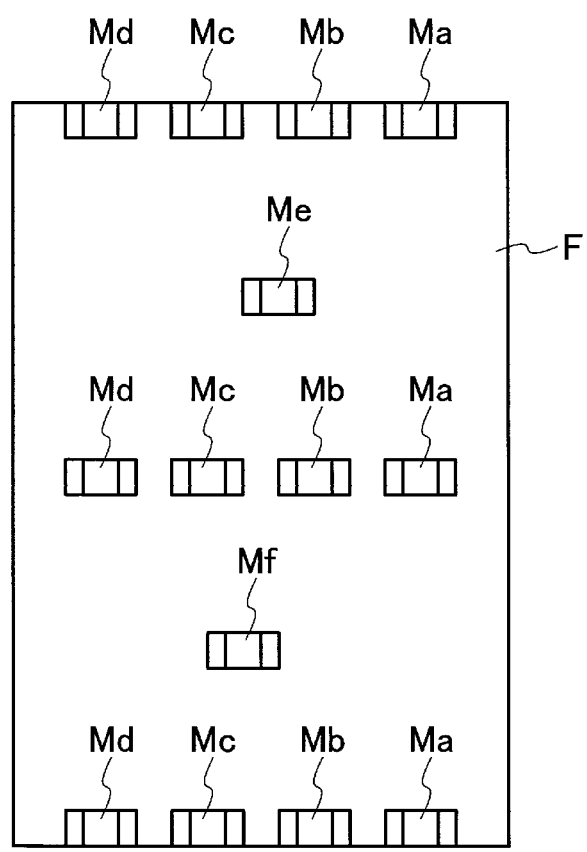
FIG. 5 is a schematic diagram illustrating another embodiment of the sheet material to which the members illustrated in FIG. 3 are attached.

FIG. 5 illustrates another embodiment regarding arrangement of members M. In FIG. 5, a member group of three members Ma, a member group of three members Mb, a member group of three members Mc and a member group of three members Md, each being arranged on a straight line in the vertical direction, form four vertical rows. In this arrangement, each of the member Me and the member Mf is arranged such that one support wall of each of the member Me and the member Mf is arranged on an identical vertical line on which one support wall of the uppermost member Mb or the lowermost member Mc is arranged. This improves the reinforcing action in the vertical direction in the rows of members Mb and Mc. As described, it is possible to configure an efficient member arrangement by changing distribution of the members M as necessary.

The member arrangement in FIG. 4A is rotationally symmetric and line symmetric with respect to the vertical axis and the horizontal axis. In FIG. 5, the arrangement excluding the member Me and the member Mf is line symmetric and rotationally symmetric, and the overall arrangement including the member Me and the member Mf is rotationally symmetric. As described above, the member arrangement having symmetry is effective for balancing the reinforcing action, and it is possible to support the sheet material efficiently. Therefore, the number of members to use can be easily reduced, which is advantageous for reducing the weight of the packing.

Figure 6A:
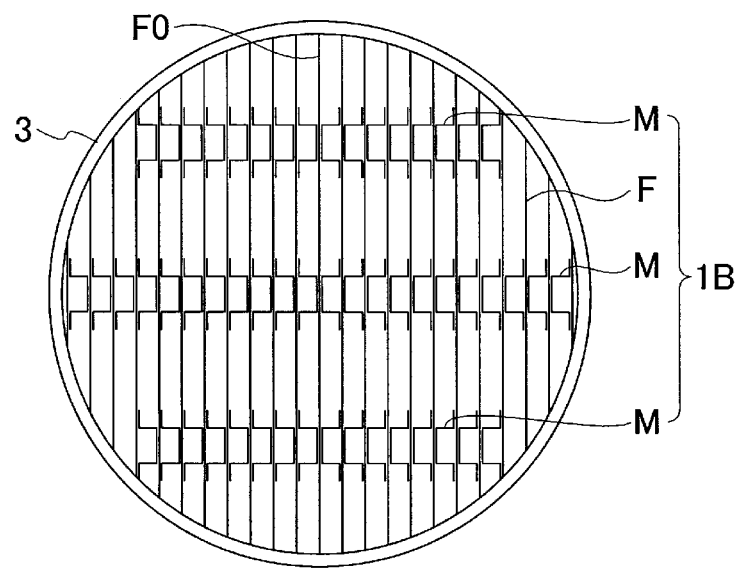
Figure 6B:
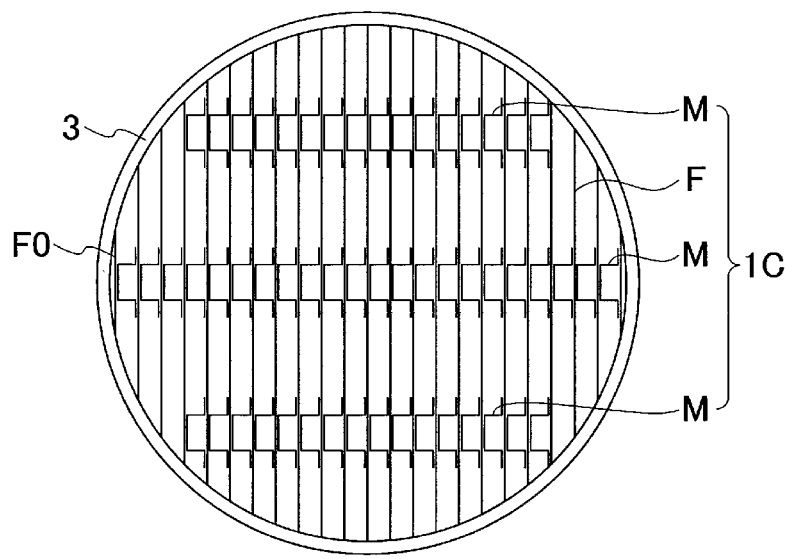
Figure 6C:
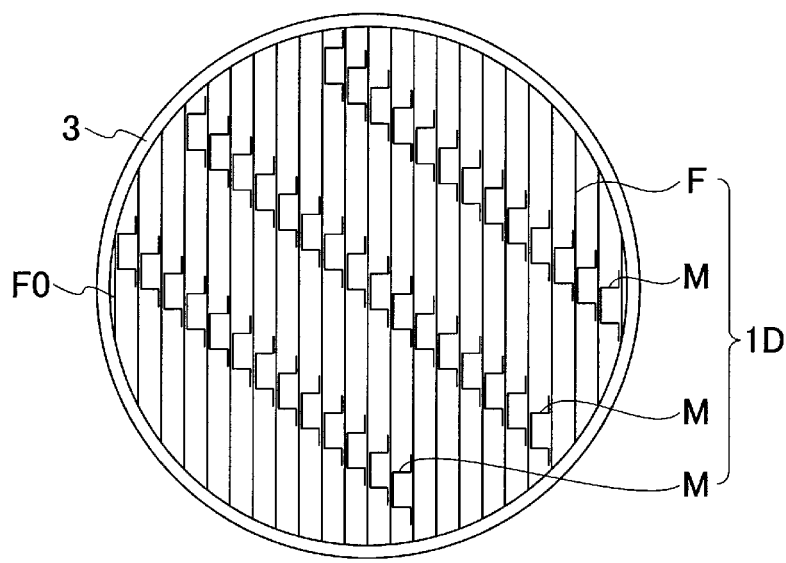

FIG. 6A to FIG. 6C are schematic views each illustrating a top surface of a packing accommodated in a container 3 in order to illustrate embodiments to form a columnar packing using rectangular sheet materials F. In order to clarify the orientation of the members M attached to the sheet material F, the members M are drawn away from the sheet material F. However, in the same way as in FIG. 4, the flanges of each member M are bonded to the sheet material F on one side, and the bridging part of each member M abuts against the sheet material F on the other side.

The columnar packing is formed by arranging the sheet materials F in parallel in a standing state in the container 3 having an annular side wall. The shapes of the sheet materials F are rectangles corresponding to parallel cross sections obtained by cutting a column at equal intervals along the axial direction, respectively. Widths of the sheet materials to use are thus different from one another. Therefore, it is impossible to unify the arrangement of members in all the sheet materials F. However, it is possible to dispose the members M as a whole in a well-balanced manner. Note that, in FIG. 6A to FIG. 6C, only the members M at the upper ends of the sheet materials F are drawn. Then, with respect to the members M on the lower side from the drawn ones, it is possible to arrange them straight in the vertical direction, or it is also possible to arrange them on inclined lines as shown in FIG. 4A, FIG. 4B or FIG. 5. With respect to arrangement of the members M on each sheet material in such a columnar packing, it is possible to determine the arrangement on the center sheet material and then, based on it, to determine the arrangement on the other sheet materials. Specifically, as an arrangement of the members M on the center sheet material, for example, the arrangement as shown in FIG. 4A, FIG. 4B or FIG. 5 is arbitrarily set. For the sheet materials arranged in parallel on both sides of the center sheet material, it is possible to set such shapes as obtained by symmetrically cutting out both side edges of the center sheet material in correspondence with the decrease in the width of the sheet materials.

In a packing 1B illustrated in FIG. 6A, no member M is attached to the center sheet material F0, and the members M are attached to be directed inward to each of the sheet materials F arranged in parallel on both sides of the sheet material F0. Therefore, the packing 1B has a plane-symmetrical configuration with respect to the sheet material F0. It is also possible to apply such a plane-symmetrical configuration to a packing having a rectangular parallelepiped shape formed by identical rectangular sheet materials. Placing as the center a sheet material that has no member attached, the members may be attached to be directed inward to the sheet materials on both sides of the center sheet material, and the sheet materials may be arranged in parallel with the center sheet material.

In a packing 1C illustrated FIG. 6B, a sheet material F0 with no member is arranged on one outer side of sheet materials F arranged in parallel, and members M are attached to the sheet materials F by uniformly directed toward the sheet material F0. The sandwiching structure is formed so as to extend in a straight-line shape through all the sheet materials including the sheet material F0 on one side. The packing 1B and the packing 1C are different from each other in the orientation of the member M. However, the packing 1B and the packing 1C are identical to each other in the positions of the members, and they can be evaluated as identical substantially to each other in the effect of supporting and reinforcing the sheet materials F and the effect of sandwiching the sheet materials F to hold the shape of the sheet material F.

In the packing 1B and 1C shown in FIG. 6A and FIG. 6B, the members M located at the upper end of the sheet materials F are arranged linearly in the perpendicular direction of the sheet materials F, and the positions of the corresponding members M are aligned among the sheet materials F. Therefore, each sheet material F is surely sandwiched and held by the members M on both sides. In contrast, in a packing 1D illustrated in FIG. 6C, the members M located at the upper ends of the sheet materials F are arranged on horizontal straight lines inclined from the perpendicular direction of the sheet material F. That is, the positions of one member on a sheet material and the corresponding member on the adjacent sheet material do not completely match each other, and the members are arranged such as to partially overlap each other. However, since one sheet material is sandwiched between the members on both sides with a part of the bridging part and the support wall thereof, it is effective to suppress deformation of the sheet material F by the sandwiching and holding. In this packing 1D, the sandwiching structure chains linearly in two rows to be configured as extending through all the sheet materials linearly.

Note that it can be easily understood from FIG. 6A to FIG. 6C that, in the present disclosure, it is possible to form the packing in various columnar shapes such as a polygonal columnar shape and an elliptic cylindrical shape, as well as a rectangular columnar shape and a cylindrical shape, by using the sheet materials F provided with the members M.

Figure 7A:
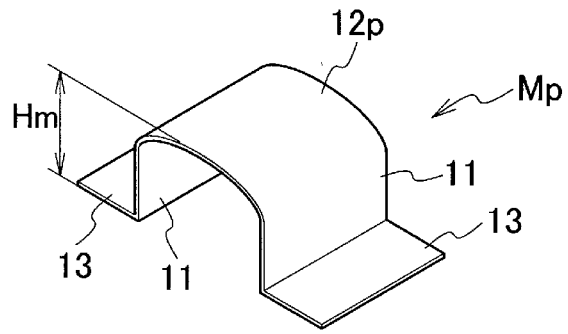
FIG. 7A, FIG. 7B, FIG. 7C and FIG. 7D are perspective views illustrating modifications of the reinforcing member attached to the sheet material.

Members Mp, Mg, Mr, and Ms illustrated in FIG. 7A to FIG. 7D are modifications of the member M, and are examples of the structure that yield strength is enhanced similarly to the member M shown in FIG. 3. The member M illustrated in FIG. 3 has a structure in which strength against the pressing load is enhanced by the action of the straight bridging part 12. In contrast, a member Mp having a structure as illustrated in FIG. 7A is obtained by changing the bridging part 12 of the member M to a bridging part 12p curved in an arch shape. The bridging part 12p of the member Mp and the upper end of the support wall 11 smoothly connect, that is, they are continuous. That is, at a connecting portion between the bridging part 12p and the support wall 11, the tangent plane of the bridging part 12p matches the support wall 11. It is possible to change the curvature of the bridging part 12p appropriately.

Figure 7B:
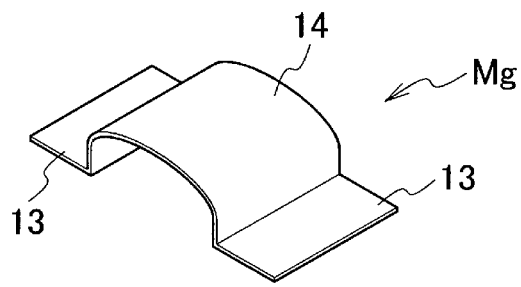

Since the bridging part 12p shown in FIG. 7A protrudes upward, the support wall 11 of the member Mp can be shortened so as to make the member Mp has the height Hm identical to the height of the member M. When further shortening the support wall 11 and substantially omitting it from the member Mp, the member Mp is transformed into a member Mg having a structure as illustrated in FIG. 7B. A bridging part 14 of the member Mg rises at both ends perpendicularly from flanges 13. Therefore, taking into consideration the fact that the liquid film formed of a liquid flowing on the sheet material F is thin, the member Mg is equivalent substantially to the member M and the member Mp with regard to the liquid wettability. That is, the bridging part 14 of the member Mg functions as the support wall 11 and the bridging part 12 of the member M.

Figure 7C:
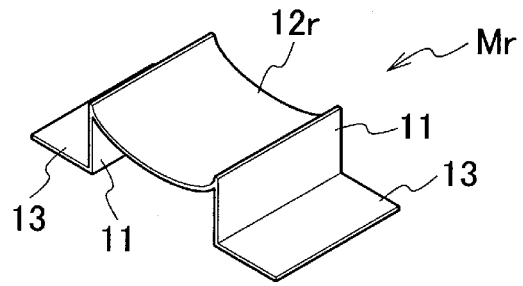

It is also possible to deform the member Mp of FIG. 7A such that connection between the curved bridging part 12p and the support wall 11 is discontinuous. A member Mr as illustrated in FIG. 7C is obtained by bending the bridging part so as to be recessed. The bridging part 12r of the member Mr does not make surface contact with the adjacent sheet material F in a state of arranging the sheet materials F in parallel. Therefore, the member Mr acts similarly to the structure of supporting a sheet material F with a pair of rib pieces (support walls), and strength against a pressing load is similarly improved by the bridging part 12r.

Figure 7D:
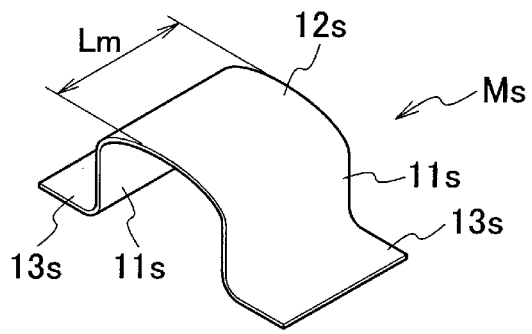

A member Ms having a structure as illustrated in FIG. 7D is obtained by deforming the member Mp illustrated in FIG. 7A such that the flange 13 and the support wall 11 are connected continuously. That is, a flange 13s, a support wall 11s, and a bridging part 12s are curved in an S shape. The member Ms has a structure having strength against a pressing load, similarly to the members Mp, Mg and Mr. Since the connection at the lower end of the support wall 11s is not perpendicular to the sheet material F, it is different in conditions relating to liquid wettability. However, curve of the lower end of the support wall 11s as illustrated in FIG. 7D is within the allowable range. In bending of a metal material, particularly bending of an expanded metal sheet, it is not easy to bend the material completely, and it is often difficult to avoid curving at the corner portion, depending on processing precision. The member Ms illustrated in FIG. 7D includes an embodiment obtained by manufacturing the member M by such bending processing. In a case where curvature (radius of curvature) of the lower end of the support wall 11s increases in manufacturing of a member, the liquid film tends to break more easily than in the case of the member M. Therefore, it is preferable to set the length Lm of the support wall shorter so as to resist the liquid film breakage.

Figure 1B:
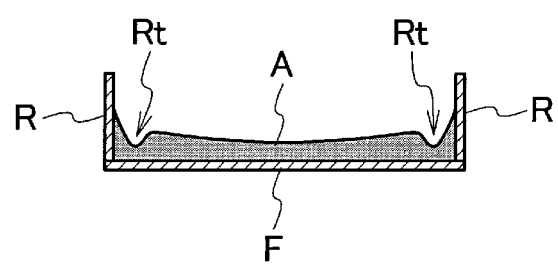
FIG. 1B is a schematic diagram illustrating a liquid film formed on a sheet material constituting the packing.

Constituting the packing 1 by arranging in parallel a plurality of sheet materials F to which the above-described members M are attached, with an interval provided between the sheet materials F in a standing state, it is usable as a packing for gas-liquid contact by loading it in the container 3 of the gas-liquid contact apparatus 2 as illustrated in FIG. 1A. In order to spray the liquid A on the packing 1 from a spray pipe 4 arranged above the packing 1, the liquid A is supplied to the spray pipe 4 of the gas-liquid contact apparatus 2 through a liquid supply line 5. And a gas G is supplied to the gas-liquid contact apparatus 2 through a gas supply line 6. Thus, the liquid A flows along the flat surfaces on the sheet materials F of the packing 1, and comes to contact with the gas G rising upward. During this gas-liquid contact, the liquid A forms a liquid film on the packing 1 and absorbs a specific component in the gas G. A gas G' from which the specific component has been separated and removed by the liquid A is discharged to the outside through a gas discharge line 7 connected to the top of the container 3. It is released into the atmosphere or is transported to another processing facility as necessary. A liquid A' which has functioned as an absorbent is stored in a bottom portion of the container 3, and then is discharged to the outside through a drain line 8 connected to the bottom portion. The discharged liquid A' can be supplied to the liquid supply line 5 after being refined (regenerated) in a facility such as a chemical plant or a thermal power plant and stored in a storage tank as necessary. Alternatively, a regeneration device for the liquid A may be additionally provided so that the liquid circulates between the gas-liquid contact apparatus 2 and the regeneration device.

In the gas-liquid contact apparatus 2, the container 3 may have any shape as long as the container 3 has a hollow shape having a filling space inside. In general, a container having a substantially tubular shape is used as the container 3. The spray pipe 4 is configured of a plurality of pipes arranged in parallel or in a lattice pattern on the upper part of the packing 1. Openings for discharging the liquid A are formed in the lower part of each pipe. However, the spray pipe 4 is not limited to such a structure, and commonly used spraying means such as a shower head, a spray nozzle, a straw nozzle or the like can be appropriately used. In FIG. 1A, the gas-liquid contact apparatus 2 is configured such that the gas G is supplied from the lower side of the container 3 and flows upward. However, it may be modified such that the gas is supplied from above and flows downward. The gas-liquid contact apparatus 2 may be additionally provided with a cooling device for pre-cooling the gas G, a drain recovery device for draining drainage, or the like, as necessary.

Examples of the gas G processed by the gas-liquid contact apparatus 2 include a waste gas (exhaust gas) and a reactant gas generated in a facility such as a chemical plant or a thermal power plant. An acid gas such as carbon dioxide, nitrogen oxides, sulfur oxides, and the like is processed as a specific component. The liquid A to use as the absorbent is selected according to the specific component to be removed from the gas G. For recovery and removal of carbon dioxide, for example, an aqueous solution of an alkali agent such as a cyclic amine compound, alkanolamine, phenolamine, an alkali metal salt is often used. An aqueous solution of an alkaline agent such as a calcium compound or a magnesium compound is generally used for removal of sulfur oxides. In a monoethanolamine (MEA) aqueous solution often used in recovery of carbon dioxide, carbamate salt/amine salt (carbamate), carbonate, bicarbonate and the like produce due to the reaction with carbon dioxide.

Therefore, each part constituting the gas-liquid contact apparatus 2 is made of a material having resistance to the components of the gas G and the chemical agents contained in the liquid A as described above. Therefore, the sheet material F and the member M are made of a material which does not cause a reaction (corrosion) with the gas G to be treated and the liquid A to be used. Examples of such a material include metals such as stainless steel, aluminum, nickel, titanium, carbon steel, brass, copper, monel metal, silver, tin, niobium, and resins such as polyethylene, polypropylene, PTFE, etc.

The sheet material F is a layer material at least the surface of which is made of a corrosion-resistant material as described above. A flat sheet having a uniform thickness and a smooth surface, or a meshed sheet or a sheet material having openings is suitable to use as the sheet material F. An expanded metal obtained by processing a metal sheet made of stainless steel, aluminum, or the like is preferable since the expanded metal is a sheet material capable of decreasing weight while maintaining the strength to the extent that it is self-sustainable by itself, and exhibits an excellent property also in wet spreading of liquid. The surface of the sheet material F may be roughened by forming fine irregularities on the surface by means of surface finishing such as filing, sand blasting treatment, ultraviolet ozone treatment, plasma treatment and the like. In addition, the sheet material F may be made of a material prepared to meet the above-described use conditions by modifying the surface by coating or the like.

The member M is made of a layer material made of a corrosion-resistant material similarly to the sheet material F described above, and may be either a flat sheet or a meshed sheet to use. In the case of using a metallic material, an elongated strip having a width corresponding to the length Lm of the support wall 11 of the member M is prepared from the metallic material, and this strip is bent into the shape of the member M as illustrated. Thus, the member M can be easily manufactured. In the case of manufacturing the member M made of a resin material, the member M can be prepared by similarly preparing an elongated strip and applying heat upon bending, or by molding the resin material using a mold. The member M made of an expanded metal is preferable because the member M is excellent in terms of wet spreading. However, it is necessary to pay attention to the fact that processing precision in manufacturing of the member M is likely to be lowered and variation is likely to occurs.

Note that, application of the packing 1 according to the embodiments of the present disclosure is not limited to the gas-liquid contact apparatus for absorbing, separating, and removing the specific component as described above. It is also applicable to apparatuses (a distillation column, a purification column, a stripping column (regeneration column) and the like) used in various chemical plants including chemical processes such as distillation, purifying, and stripping.

As can be understood from the above, according to the embodiments of the present disclosure, it is possible to provide a packing capable of realizing a gas-liquid contact apparatus with less pressure loss at gas-liquid contact and good energy efficiency during operation. That is, it is possible to solve the problems such as weight reduction of the apparatus to which the packing is applied and reduction of manufacturing and processing costs of the packing, which is economically very advantageous. In addition, as an embodiment of the present disclosure, a member group having a plurality of support members used for constituting the packing can be provided, and the member group can be used as a support for the packing. According to the embodiments, the member group is such a member group including a plurality of support members, for application to a packing for gas-liquid contact, which is used by arranging a plurality of sheet materials in parallel in a standing state with an interval between the sheet materials and causing a liquid to flow along a flat surface. Each of the plurality of support members includes a pair of support walls that can be connected at one side thereof to the sheet material so as to be parallel to the liquid flow direction and perpendicular to the flat surface on which the liquid flows, and a bridging part connecting the other sides of the pair of support walls.

EXAMPLES

<Evaluation of Liquid Film Formation by CFD Analysis>

An analysis of a liquid film flow (CFD analysis) was carried out based on Computational Fluid Dynamics. In this analysis, it is possible to obtain numerical analysis results of three-dimensional unsteady flow by solving a mass conservation equation (equation of continuity) and a momentum conservation equation (Navier-Stokes equation) in a one-fluid model. Note that the analysis was carried out here using FLUENT (registered trademark, ANSYS, Inc.), which is general-purpose thermal fluid analysis software, and the behavior of a gas-liquid interface was predicted by using a VOF (Volume of Fluid) model, which is one of the interface tracking methods. Further, without using the turbulence model, the liquid entrance boundary was specified with the liquid film thickness constant, giving the condition of inflow at uniform flow velocity. The sheet material F and the rib R were subjected to the No-slip condition, and the other boundary surfaces were set to be outflow boundaries of static pressure provisions. Since the CFD analysis is a known analysis method, a detailed explanation will be omitted here.

In this CFD analysis, assuming air as the gas, water as the liquid, and stainless steel as the sheet material F, the relationship between the contact angle θs of the rib R and the liquid-film length ratio Lw/Lt was examined under the condition that an angle α of the sheet material F with respect to the horizontal plane was 60°, and the ambient temperature was 20° C. As a result, the graph as illustrated in FIG. 2A was obtained.

<Preparation of Member>

An SUS304 steel sheet (thickness: 0.3 mm) and an SUS304 expanded metal sheet (thickness: 0.3 mm, center-to-center distance in the short mesh direction: 1.8 mm, center-to-center distance in the long mesh direction: 3.0 mm) were prepared, and subjected to bending processing. Thus, a member Mx made of the steel sheet and a member My made of the expanded metal sheet were prepared. Each of the member Mx and the member My had the shape illustrated in FIG. 3 (length Lm of the support wall 11: 10 mm, height Hm: 4.7 mm, width of the bridging part 12: 10 mm, width Wf of the flange 13: 5 mm).

<Sheet Material>

An SUS304 expanded metal sheet (thickness: 0.3 mm, center-to-center distance in the short mesh direction: 1.8 mm, center-to-center distance in the long mesh direction: 3.0 mm) was prepared and used in the following preparation.

(Sample 1)

The above expanded metal sheet was cut into a rectangular shape with a lateral width of 140 mm and a length of 210 mm in an arrangement in which the short mesh direction was the longitudinal direction (vertical direction), and a sheet material of sample 1 was prepared.

(Sample 2)

The following operations were carried out using twelve members Mx (made of steel sheet) and the sheet material of sample 1. The members Mx were divided into two member groups each having five members Mx, and two additional members Mx. The members Mx of the two member groups were disposed on the sheet material in a standing state in such an arrangement that the members Mx of the two member groups were aligned on two parallel straight lines inclined from the vertical direction. Then on both sides of this arrangement, the two additional members Mx were placed. At that time, in each member group, the members Mx were arranged such that the upper end of the uppermost member Mx matched the upper end of the sheet material F, the lower end of the lowermost member Mx matched the lower end of the sheet material F, and the five members Mx were arranged at equal intervals. In addition, the inclination of the row of the members Mx were set such that one support wall of one member Mx and one support wall of the upper or lower member Mx in each member group were arranged on a vertical line. Therefore, the interval in the vertical direction between the bridging part of one member Mx and the bridging part of the upper or lower member Mx constituting the member group was 40 mm. Each of the two additional members Mx was arranged at a location where the interval between the bridging part and the side end of the sheet material F was 10 mm, such that the upper end or the lower end of the member matched the upper end or the lower end of the sheet material F. Then, each of the interval (distance between the bridging parts) between the two uppermost members Mx of the two member groups and the interval between the uppermost member Mx and one additional member Mx located at the upper end of the sheet material was set to 40 mm. After determining the arrangement of the members Mx in this manner, the flange of the member Mx was joined to the sheet material by spot welding, and thus a sheet material of sample 2 was prepared.

(Sample 3)

The members My were arranged on the sheet material in the same manner as that in Sample 2 except that twelve members My (made of expanded metal sheet) were used in place of the twelve members Mx. The members My were then attached to the sheet material by spot welding, and a sheet material of Sample 3 was prepared.

<Evaluation of Liquid Film Formation>

In each of Samples 1 to 3, placing the sheet material vertically and connecting a string to each of both ends of the upper end of the sheet material, the sheet material was hung from a load cell with the strings. Furthermore, in order to supply a liquid (water), two pointed pieces (drip points) were attached, simulating a liquid distributor, to an overflow-type pipe so as to be directed downward and is was placed above the center of the upper end of the sheet material. The liquid was supplied at a constant flow rate (supply width (width of two pointed pieces): 50 to 100 mm) to the sheet material and the liquid was made to flow. An image of a liquid film (a part wetted by the flowing liquid) formed by the flowing liquid on the sheet material was created by photographing the sheet material with a camera at an imaging angle perpendicular to the sheet material.

By using the obtained image, the area of the liquid film formed on the sheet material (area of the part wetted by the liquid) was measured, and the area was considered as the wetted area of the sheet material. Note that, during this measurement, the weight of the sheet material was measured using the load cell, and the weight of the liquid wetting the sheet material was obtained based on the weight difference before and after supply of the liquid. In this manner, validity of the area value of the liquid film measured from the image was confirmed.

When the area values of the liquid film in Sample 2 and Sample 3 were evaluated with reference to the area value of the liquid film in the sheet material of sample 1 (100%), the ratios were 99.0% (Sample 2), and 99.5% (Sample 3), respectively. In addition, there was no observation of the liquid film breakage caused by the support wall of the members, in Sample 2 and Sample 3.

<Packing>

(Sample 2A)

In order to configure a columnar packing having a diameter of 240 mm and a length of 210 mm with use of 47 sheet materials (pitch: 5 mm), an SUS304 expanded metal sheet (thickness: 0.3 mm, center-to-center distance in the short mesh direction: 1.8 mm, center-to-center distance in the long mesh direction: 3.0 mm) was cut to prepare 47 rectangular sheet materials having different lateral widths corresponding to arranged positions. The members Mx (made of steel sheet) were attached to each of the obtained sheet materials by spot welding and the sheet materials were assembled so as to be arranged in parallel in a standing state to prepare a packing of Sample 2A. Regarding the arrangement of the members Mx, on the center sheet material, 20 members Mx were divided into four groups, with five members Mx configured as one group, and they were arranged similarly to the arrangement of the member groups in Sample 2. Specifically, the members Mx were attached such that four rows each including five members Mx aligned at equal intervals in a straight line inclined from the vertical direction were formed in parallel at equal intervals. On each of the sheet materials arranged on both sides of the center sheet material, the members Mx were attached so that the sheet materials have a shape, respectively, obtained by symmetrically cutting both side edges of the shape of the center sheet material in accordance with a decrease in width of the sheet materials. On the top surface of the assembled packing, the uppermost members Mx of the sheet materials aligned on four straight lines that were spaced equally and perpendicular to the sheet material. That is, the packing was formed so that the sandwiching structure of the sheet materials extended linearly through all the sheet materials.

(Sample 3A)

Plate materials for forming a columnar packing were prepared in the same manner as that in Sample 2A. Then the members My were arranged on the sheet materials in the same manner as in Sample 2A except that members My (made of expanded metal sheet) were used in place of the members Mx. Attaching the members My to the sheet materials by spot welding, the sheet materials were assembled so as to be arranged in parallel in a standing state, and thus a packing of sample 3A was prepared.

<Evaluation of Durability of Packing>

Two sets of columnar packing were prepared in each of Sample 2A and Sample 3A. A first set of packing was loaded into a circular pipe having a diameter of 240 mm, assuming the container 3 of the gas-liquid contact apparatus 2, so that the sheet materials were arranged in parallel in a standing state. A second set of packing was placed on the first set of packing such that the sheet materials of the first packing and the sheet materials of the second packing were perpendicular to each other. Displacement in the vertical direction of the packing due to deformation of the packing was measured while applying a load so that the packing was compressed at a compression rate of 8 mm/1 min in the vertical direction by using a compression tester, and the load (buckling load) upon buckling (sharp deformation) of the packing was measured. As a result, the buckling loads were 223 kg for Sample 2A and 280 kg for Sample 3A. Both Sample 2A and Sample 3A had strength enough to be used.

From the evaluation of the durability and the evaluation of the liquid film formation as described above, the packing in each of samples 2A and 3A are favorable in terms of durability and wettability and are useful.

According to the present disclosure, a packing is provided which is applied to a gas purification apparatus, a gas separation apparatus or the like that separates, removes or recovers a specific gas component such as an acid gas or a harmful gas from a gas to be treated such as an exhaust gas or a mixed gas. Then it promotes absorption of the specific gas component into an absorbent by gas-liquid contact between the gas to be treated and the absorbent. Energy efficiency during operation of the gas-liquid contact apparatus is good, and favorable gas-liquid contact and efficient component transfer are possibly realized while suppressing pressure loss. A generalized packing which achieves economic improvement can contribute to improvement of efficiency in chemical treatment and manufacturing processing, prevention of environmental pollution as a result of widespread treatment of an exhaust gas such as a combustion gas. In addition, it is possible to contribute to effective use of resources by reducing the weight of the apparatus and reducing manufacturing and processing cost.

As there are many apparently widely different embodiments of the disclosure that may be made without departing from the spirit and scope thereof, it is to be understood that the disclosure is not limited to the specific embodiments thereof, except as defined in the appended claims.

What is claimed is:

1. A packing for gas-liquid contact comprising a plurality of sheet materials, the plurality of sheet materials being spaced and arranged in parallel, to be used in a standing state to cause a liquid to flow along a flat surface of each of the plurality of sheet materials, wherein each one of the plurality of sheet materials comprises:

at least one member group including a plurality of support members which are attached to the sheet material and are arranged in such a manner that an upper end of an uppermost support member corresponds to an upper end of the sheet material and that a lower end of a lowermost support member corresponds to a lower end of the sheet material in the standing state, wherein each of the plurality of support members includes:

a pair of support walls each of which is connected to the sheet material at one side so as to be parallel to a liquid flow direction and perpendicular to the flat surface along which the liquid flows; and a bridging part that connects the other sides of the pair of support walls, and wherein the at least one member group in each of the plurality of sheet materials is positioned such that, in the standing state, a sandwiching structure is formed that one sheet material of the plurality of sheet materials is held by at least one of the plurality of support members attached to the one sheet material and at least one of the plurality of support members attached to an adjacent sheet material, and that the sandwiching structure extends in a linear shape through the plurality of sheet materials.

2. The packing according to claim 1, wherein in each of the plurality of support members, each of the pair of support walls has a length in the liquid flow direction that is less than or equal to a length of a liquid film which is formed by the liquid flowing along the sheet material and which is possibly maintained against breakage that may occur in relation to a wetting angle of a surface of the support walls.

3. The packing according to claim 2, wherein in each of the plurality of support members, the pair of support walls are laminar and have a rectangular shape with a length in the liquid flow direction of not less than 3 mm and not more than 30 mm.

4. The packing according to claim 1, wherein in each of the plurality of support members, an interval between the pair of support walls is not less than 5 mm and not more than 20 mm.

5. The packing according to claim 1, wherein in each of the plurality of support members, each of the pair of support walls has a height corresponding to an interval between the plurality of sheet materials in the standing state.

6. The packing according to claim 1, wherein in each of the plurality of support members, the bridging part is connected perpendicularly to the pair of support walls, and has a rectangular shape with a length identical to a length of each of the pair of support walls and a width identical to an interval between the pair of support walls.

7. The packing according to claim 1, wherein in the standing state, the plurality of support members of the at least one member group are arranged on a vertical line or on a straight line inclined from a vertical direction, and the plurality of support members are arranged such that a distance in the vertical direction between a lower end of one support member of the at least one member group and an upper end of a support member adjacent to the one support member on a lower side of the one support member is 2 to 10 times a length of the pair of support walls in the liquid flow direction.

8. The packing according to claim 7, wherein in the at least one member group, the plurality of support members are arranged on a straight line inclined from the vertical direction in the standing state, and one of the pair of support walls of one support member of the plurality of support members and one of the pair of support walls of a support member adjacent to the one support member on an upper side or a lower side of the one support member are on an identical vertical line.

9. The packing according to claim 8, wherein each of the plurality of sheet materials further comprises a first additional support member and a second additional support member which have the same structure as the structure of the plurality of support members and which are distributed on both sides of the straight line in which the plurality of support members of the at least one member group are arranged such that, in the standing state, an upper end of one of the first additional support member and the second additional support member corresponds to the upper end of the sheet material and a lower end of the other corresponds to the lower end of the sheet material.

10. The packing according to claim 1, wherein the number of the at least one member group of each of the plurality of sheet materials is plural, and in each of the plurality of sheet materials, a distance between two support members adjacent to each other in a horizontal direction in the standing state is 2 to 20 times an interval between the pair of support walls of each of the plurality of support members.

\* \* \* \* \*